United States Patent
Porst

[15] 3,657,120
[45] Apr. 18, 1972

[54] METHOD OF STABILIZING BROMINE-CONTAINING FIRE EXTINGUISHING HALOGENATED HYDROCARBON COMPOSITION

[72] Inventor: Peter Porst, Neuruppin, Germany
[73] Assignee: VEB Feuerloschgeratewerk Neuruppin, Neuruppin, Germany
[22] Filed: Mar. 23, 1970
[21] Appl. No.: 22,077

[52] U.S. Cl. .................................. 252/8, 252/68, 252/393, 252/396
[51] Int. Cl. ........................... A62d 1/00, C23f 11/10
[58] Field of Search ............... 252/3, 8, 8.05, 393, 396, 388, 252/68

[56] References Cited

UNITED STATES PATENTS

| | | | |
|---|---|---|---|
| 1,151,255 | 8/1915 | Ferguson | 252/396 |
| 2,008,680 | 3/1931 | Carlisle et al. | 252/68 |
| 2,339,796 | 1/1944 | Mosher | 252/393 |
| 2,674,553 | 7/1950 | Shnitzler | 252/396 |
| 2,821,257 | 1/1958 | Buckley | 252/8 |
| 3,277,120 | 10/1966 | Fullhart, Jr. et al. | 252/393 |

FOREIGN PATENTS OR APPLICATIONS

| | | | |
|---|---|---|---|
| 464,026 | 3/1950 | Canada | 252/8 |

*Primary Examiner*—John T. Goolkasian
*Assistant Examiner*—D. J. Fritsch
*Attorney*—Karl F. Ross

[57] ABSTRACT

Bromine-containing halogenated hydrocarbons, especially bromocarbons, bromochlorocarbons, bromofluorocarbons, and bromochlorofluorocarbons, are stabilized by incorporating in them 0.05 to 0.15 weight percent of an aromatic polyhydric alcohol of the phenol type (preferably pyrocatechol) and 0.025 to 0.075 percent by weight of an aromatic carboxylic acid (preferably benzoic acid). The stabilized composition is noncorrosive to steel when saturated with moisture, even under high oxygen pressure, and is especially suitable for long-term storage in metal vessels as a fire-extinguishing composition.

6 Claims, No Drawings

METHOD OF STABILIZING BROMINE-CONTAINING FIRE EXTINGUISHING HALOGENATED HYDROCARBON COMPOSITION

My present invention relates to a process for the stabilization of halogenated hydrocarbons and, more particularly, the stabilization of bromine-containing hydrocarbons.

It has already been proposed to provide stabilizers for hydrocarbons, in order to prevent deterioration thereof and the formation of decomposition products which may attack the vessel containing the hydrocarbons or equipment in which the hydrocarbons are used.

Such hydrocarbons have been found useful as fire-extinguishing compounds and it is not uncommon to provide metal fire extinguishers with a charge of a hydrocarbon.

An advantage of the use of halogenated hydrocarbon as a fire-extinguishing medium is that the hydrocarbons are substantially noncombustible, have a high heat capacity and a corresponding tendency to absorb heat from a combustion reaction while lowering the temperature at the combustion site, and have a high density in the gaseous state, therefore forming a blanket capable of excluding oxygen from the combustion zone.

Chlorinated hydrocarbons have been stabilized heretofore with a binary combination of polyhydroxy alcohols e.g. 1,2-benzenediol) and epoxy compounds. Another stabilization system for chlorinated hydrocarbons such as perchlorethylene and trichloroethylene, makes use of a combination of an oxime, an epoxide and a dialkylhydrazone.

Primarily, these stabilizers are of a basic nature and operate, at least in part, by neutralization or reaction with the decomposition products of the chlorinated hydrocarbon. It is recognized, for example, that trichloroethylene and perchlorethylene, when stored, give rise to hydrogenchloride and phosgene as decomposition products and that the hydrocarbons manifest an increasing acidity with increasing storage time. The decomposition can be countered by the use of the aforementioned stabilization systems which appear to function, with the aid of the catalytic activity of iron, aluminum and zinc ions, to combine with the reaction products, hydrogen chloride, phosgene and elemental chlorine. The decomposition reaction is itself promoted by the presence of moisture, light or oxygen.

It has not, however, been possible heretofore to stabilize bromine-containing hydrocarbons (bromocarbons) and hydrocarbons containing both bromine and chlorine (bromochlorocarbons) with stabilization systems of the aforedescribed type. This disadvantage is particularly acute because of the fact that bromocarbons and bromochlorocarbons have been found to be better fire-extinguishing substances than the chlorinated hydrocarbons described earlier and thus are most desirable for use in fire extinguishers which must be stored for long periods of time.

It is a common practice to use iron or aluminum containers for such fire extinguishers and to provide zinc coatings along the interior walls of the fire extinguisher, these materials being susceptible to deterioration by the decomposition process of bromocarbons and bromochlorocarbons.

It is, therefore, the principal object of the present invention to provide a method of stabilizing bromocarbons and bromochlorocarbons.

Another object of this invention is to provide an improved method of stabilizing halogenated hydrocarbons to prevent the formation of decomposition products capable of attacking metallic vessels in which the hydrocarbons may be stored.

Yet a further object of the instant invention is to provide a stable halogenated hydrocarbon composition particularly adapted for use as a fire-extinguishing medium.

It is another object of my present invention to provide an improved, stable fire-extinguishing composition containing bromine-substituted and bromine-chlorine substituted hydrocarbons which have low propensity to attack metallic vessels such as fire-extinguishing receptacles.

It has been observed in practice that bromine-containing hydrocarbons and bromochlorohydrocarbons are even stronger corrosive agents, with decomposition, than the chlorinated hydrocarbons free from bromine. In the following table, there is given the corrosive effect of different halogenated hydrocarbons upon steel and brass in a dry and wet condition, respectively. The table is drawn from the work of DOWNING & EISEMANN, NFPA Quarterly, Oct. 1951, page, 115:

TABLE

| Halogenated Hydrocarbon | Corrosion: inches/month×10⁻⁶ | | | |
|---|---|---|---|---|
| | Steel | | Brass | |
| | Dry | Wet | Dry | Wet |
| CCl₄ | 1.5 | 93 | 8.7 | 215 |
| CH₃Br | 42.0 | 650 | 310.0 | 250 |
| CH₃ClBr | 27.0 | 280 | 200 | 1,620 |
| C₂F₄ClBr² | 2.4 | 125 | 370 | 1,175 |

In determining the corrosive activity of halogenated hydrocarbons, strips of steel and brass are immersed for a period of 260 days at a temperature of 120° C. in sealed hydrocarbon-containing glass tubes. The hydrocarbon in the tubes was either dry or supplemented with moisture (wet) to an amount of about 3 volume-percent. After the indicated time period, the strips were removed and the depth of corrosion penetration measured, the corrosivity being indicated in inches per month × $10^{-6}$.

It is thus evident that bromohydrocarbons and bromochlorohydrocarbons are even more disadvantageous than chlorinated hydrocarbons unless stabilized, especially when they are to be used in fire extinguishers having condensers composed of metal. In general, it is found that stability of the halogenated hydrocarbons cannot be maintained either in the gas phase or in the liquid phase or in the boundary layer between these phases, nor can the bromine-containing hydrocarbons be stabilized under elevated oxygen partial pressure by conventional systems. When these combinations are intended for use as fire-extinguishing media, they must be capable of being stored under elevated oxygen pressures for periods of at least ten years.

It is, therefore, a further object of this invention to provide a fire-extinguishing composition including bromine-containing and bromochloro hydrocarbons which is capable of being stored for a period of 10 years or more in steel or other metallic vessels.

These objects and others which will become apparent hereinafter are attained in accordance with the present invention, with a stabilization system which has been found to be especially satisfactory with bromine-containing hydrocarbons and especially hydrocarbons in which one or more hydrogen atoms are replaced by bromine together with or without replacement of other hydrogen atoms by chlorine. The halogenated hydrocarbons with which the present invention is concerned, therefore, are those which can be represented by the formula:

$$C_nH_{(2n+2-x-y)}Br_xCl_4$$

where C represents the carbon atom, H represents the hydrogen atom. Br represents bromine, and Cl represents chlorine, $n$ is the carbon number of the compound (preferably 1 to 4), $x$ is the bromine number of the compound which must be at least 1 but preferably ranges between 1 and 4, and $y$ is the chlorine number of the compound and may be 0 but preferably is between 1 and 3 and is less than the bromine number $x$. The parenthetical expression $(2n+2-x-y)$ represents the number of hydrogen atoms per molecule. The stabilization system, which has been found to restrict the catalytic decomposition of such compounds in the presence of moisture and under high oxygen partial pressures, makes use of a binary combination of a polyhydric phenol-type compound and an aromatic monocarboxylic acid. The system has been found to be especially useful with monochloromonobromomethane, ethyl bromide, methylene bromide, methyl bromide, tetrafluorodibromomethane, difluorochlorobromomethane and trifluorobromomethane.

According to a specific feature of this invention, the polyhydric alcohol is 1,2-benzenediol (pyrocatechol) while the aromatic carboxylic acid is benzoic acid. It should be pointed out, moreover, that the halogenated hydrocarbon molecule with which the present stabilizer is most effective, can also contain fluorine or may be present in a mixture with fluorocarbons and fluorochlorocarbons. Consequently, the invention is applicable to compounds of the general formula:

$$C_nH_{2n-x-y-z}Br_xCl_yF_z,$$

where $x$ is at least equal to unity and otherwise has the definitions given above, and $y$ and $z$ may be 0 and generally are less than $x$. It will be apparent that $z$ may be a positive integer when $y$ is 0 and vice versa. Compounds of this type may be present in admixture with fluorocarbons, especially fluorine-containing derivatives of ethane and methane.

The quality of stabilizing substances introduced into the halogenated hydrocarbon composition will depend, of course, upon the conditions under which the composition is to be stored and the quantity of hydrocarbon present. In general the pyrocatechol (1,2-benzenediol) should be present in the amount ranging between 0.05 percent by weight of the composition to 0.15 percent by weight. The benzoic acid should be present in an amount ranging from 0.25 percent by weight of the composition to 0.075 percent by weight and preferably is used in a weight proportion equivalent to half that of the pyrocatechol. While I do not wish to be bound by any theories regarding the manner of operation of the stabilizing system of the present invention, it appears that the stabilizers act by forming chemical compounds with the decomposition products and by forming a stable protective layer inside upon the surface of the metal vessel, thereby restricting attack by hydrogen chloride, hydrogen bromide, chlorine, bromine and phosgene upon the surface of the metallic vessel. It has been found that the stabilizing system remains effective at its optimum level when the composition has increased moisture contact or is maintained under high oxygen partial pressure in the liquid phase, in the vapor phase and in the boundary layer. In fact, the stabilizing system prevents or sharply limits corrosion of steel surfaces even when the bromine-containing halogenated hydrocarbon is maintained under an oxygen pressure of 16 atmospheres or above.

The system of this invention has the further advantage that, prior to filling a fire extinguisher or preparing the composition for introduction into a fire extinguisher, it is not necessary to use any expensive drying procedure to reduce the water content as has been necessary heretofore. The fire-extinguishing capabilities are unaffected by the stabilized system which, as indicated, renders the composition almost totally noncorrosive both in the liquid and in the vapor phase. It would thus appear that the stabilizer is distributed successfully between the liquid phase and the vapor phase thereabove to whatever extent is necessary to preclude corrosion.

EXAMPLE

Square steel sheets of 10 cm on a side are immersed two-thirds in the liquid phase of a water-saturated non-stabilizing monochloromonobromomethane, the other third of the plates reaching into the gas phase thereabove. After 2 hours, incipient corrosion is observed on the plate and the strongest corrosive action is noted at the boundary layer. The degree of corrosion was evaluated as of the second degree according to the TGL 14302 standard test. After 24 hours, the corrosion had reached degree 5 of TGL 14302.

In a parallel test, a similar steel sheet was immersed in the same bromochlorohydrocarbon, stabilized with pyrocatechol and benzoic acid. 1 gr of pyrocatechol and 0.5 gr of benzoic acid is used per kilogram of the monochloromonobromomethane. After 6,500 hours of test, the sheet still shows no corrosion and is assigned a degree level of 0 under TGL 14302. A gravimetric evaluation of the sheet demonstrates that there is a progressive increase of the weight of the plate in the stabilizing system. Since this weight increase appears to be accompanied by no corrosion, it is believed that the increase is a consequence of a formation of an anticorrosion protective film upon the steel plate.

I claim:

1. A method of stabilizing a bromine-containing halogenated hydrocarbon composition, comprising at least one compound with the general formula $$C_nH_{2n+2-x-y-z}Br_xCl_yF_z$$

where $n$ is the carbon number of the hydrocarbon and ranges between 1 and 3, $x$ represents the bromine number of the hydrocarbon and is equal at least to 1 and $y$ and $z$ represent the chlorine and fluorine numbers of the halogenated hydrocarbon and may be zero, comprising distributing therein 0.05 percent by weight to 0.15 percent by weight of 1,2-benzenediol and 0.075 percent by weight to 0.25 percent be weight of benzoic acid and in an amount sufficient to limit the corrosivity of the composition with respect to steel and other metals.

2. The method defined in claim 1 wherein said halogenated hydrocarbon is selected of the group which consists of ethylbromide, methylbromide, methylenebromide, monochloromonobromoethane, tetrafluorodibromoethane, difluorochlorobromomethane and trifluorobromomethane.

3. The method defined in claim 2 further comprising the step of storing said composition for a prolonged period in a metallic vessel under an oxygen pressure for subsequent use as a fire extinguishing media.

4. A fire extinguishing composition comprising a bromine-containing halogenated hydrocarbon having the general formula $$C_nH_{2n+2-x-y-z}Br_xCl_yF_z$$

wherein $n$ is the carbon number of the hydrocarbon and ranges between 1 and 3, $x$ represents the bromine number of the hydrocarbon and is equal at least to 1, and $y$ and $z$ represent the chlorine and fluorine numbers of the halogenated hydrocarbon and may be zero, and a stabilizing system distributed in said hydrocarbon and consisting essentially of 0.05 percent by weight to 0.15 percent by weight of pyrocatechol and 0.25 percent by weight to 0.075 percent by weight benzoic acid.

5. The composition defined in claim 4 wherein said halogenated hydrocarbon is selected from the group which consists of ethylbromide, methylbromide, methylenebromide, monochloromonobromoethane, tetrafluorodibromoethane, difluorochlorobromomethane and trifluorobromomethane, the composition being stored in a metallic vessel under an oxygen pressure.

6. The composition defined in claim 5 wherein said pyrocatechol is present in an amount of weight twice that of the benzoic acid.

* * * * *